United States Patent
Mastromatteo et al.

(10) Patent No.: US 6,673,593 B2
(45) Date of Patent: Jan. 6, 2004

(54) INTEGRATED DEVICE FOR MICROFLUID THERMOREGULATION, AND MANUFACTURING PROCESS THEREOF

(75) Inventors: Ubaldo Mastromatteo, Bareggio (IT); Flavio Villa, Milan (IT); Gabriele Barlocchi, Cornaredo (IT)

(73) Assignee: STMicroelectronics S.r.l., Agrate Brianza (IT)

(*) Notice: Subject to any disclaimer, the term of this patent is extended or adjusted under 35 U.S.C. 154(b) by 331 days.

(21) Appl. No.: 09/779,980

(22) Filed: Feb. 8, 2001

(65) Prior Publication Data

US 2001/0024820 A1 Sep. 27, 2001

(30) Foreign Application Priority Data

Feb. 11, 2000 (EP) .............................. 00830098

(51) Int. Cl.⁷ ................................ C12M 1/00
(52) U.S. Cl. ................ 435/283.1; 435/287.2; 435/288.3; 435/303.1; 204/451; 366/341; 422/102
(58) Field of Search .................. 204/450, 451, 204/452, 453, 454, 455, 456, 600, 601–605; 366/336, 340, 341; 422/68.1, 100, 101, 102, 283.1; 435/287.2, 288.3, 303.1

(56) References Cited

U.S. PATENT DOCUMENTS

| | | | |
|---|---|---|---|
| 5,429,734 A | 7/1995 | Gajar et al. | 204/299 |
| 5,639,423 A * | 6/1997 | Northrup et al. | 422/50 |
| 5,690,841 A | 11/1997 | Elderstig | 216/39 |
| 5,858,195 A | 1/1999 | Ramsey | 204/601 |
| 6,001,229 A | 12/1999 | Ramsey | 204/451 |
| 6,010,607 A | 1/2000 | Ramsey | 204/435 |
| 6,010,608 A | 1/2000 | Ramsey | 204/453 |
| 6,319,469 B1 * | 11/2001 | Mian et al. | 422/64 |
| 6,368,871 B1 * | 4/2002 | Christel et al. | 436/180 |
| 6,403,367 B1 * | 6/2002 | Cheng et al. | 435/287.1 |
| 6,440,725 B1 * | 8/2002 | Pourahmadi et al. | 435/288.5 |

FOREIGN PATENT DOCUMENTS

GB 2 325 464 A 11/1998

OTHER PUBLICATIONS

Kopp, Martin U. et al., "Chemical Amplification: Continous–Flow PCR on a Chip," Science, vol. 280, pp. 1046–1048: May 15, 1998.

* cited by examiner

*Primary Examiner*—David A. Redding
(74) *Attorney, Agent, or Firm*—Lisa K. Jorgenson; E. Russell Tarleton; Seed IP Law Group PLLC

(57) ABSTRACT

The integrated device for microfluid thermoregulation comprises a semiconductor material body having a surface; a plurality of buried channels extending in the semiconductor material body at a distance from the surface of the semiconductor material body; inlet and outlet ports extending from the surface of the semiconductor material body as far as the ends of the buried channels and being in fluid connection with the buried channels; and heating elements on the semiconductor material body. Temperature sensors are arranged between the heating elements above the surface of the semiconductor material body.

27 Claims, 8 Drawing Sheets

INTEGRATED DEVICE FOR MICROFLUID THERMOREGULATION, AND MANUFACTURING PROCESS THEREOF

TECHNICAL FIELD

The present invention refers to an integrated device for microfluid thermoregulation and a manufacturing process thereof.

BACKGROUND OF THE INVENTION

As is known, the treatment of some fluids involves an increasingly precise temperature regulation, in particular when chemical or biochemical reactions are involved. Furthermore frequently the need is felt of using very small amounts of fluid since the fluid is costly or not readily available.

For example, in the DNA amplification process (Polymerase Chain Reaction process, or PCR process) in which precise temperature control in the various steps (it is necessary to perform repeated preset thermal cycles), there is a need to avoid as far as possible thermal gradients in the fluid reaction areas (so that in these areas there may be a uniform temperature), and also the quantity of fluid used (which is very costly) is of crucial importance for obtaining a good reaction efficiency or even for obtaining the reaction itself.

Other examples of fluid treatment having the above characteristics are, for example, linked to the performance of chemical and/or pharmacological analyses, biological tests, etc.

At present, various techniques are available that enable thermal control of chemical or biochemical reagents. A first technique uses a reactor including a glass or plastic base on which a biological fluid is deposited by a pipette. The base rests on a hotplate called "thermo-chuck", which is controlled by external instrumentation.

Another known reactor includes a heater, which is controlled by appropriate instrumentation and on which a biological fluid to be examined is deposited. The heater is supported by a base also carrying a sensor set in the immediate vicinity of the heater and is also connected to the temperature regulation instrumentation, so as to enable precise temperature control.

Both types of reactors are often enclosed in a protective casing.

A common disadvantage of the above known reactors lies in the large thermal mass of the system; consequently, they are slow and have high power absorption. For example, in case of the PCR process mentioned above, times of the order of 6–8 hours are required.

Another disadvantage of known solutions is linked to the fact that they are able to treat only relatively high volumes of fluids (i.e., minimum volumes of the order of milliliters) because of the macroscopic dimensions of the reactors.

The above disadvantages result in very high treatment costs (in the case of the aforementioned PCR process, the cost can amount to several hundreds of dollars); in addition, they restrict the application of known reactors to test laboratories alone.

A recent solution (see, for example, U.S. Pat. No. 5,858, 195) describes a microchip laboratory system and method that enable manipulation of a fluid for a plurality of applications including injection of samples for chemical separation. The microchip is manufactured using standard photolithographic procedures and by etching a substrate, preferably of glass, on which surface channels are made and which is bonded directly on a covering plate. Also envisaged is the use of a silicon substrate. However, there is a need to furnish precise thermoregulation.

SUMMARY OF THE INVENTION

According to the embodiments of the present invention, an integrated device for microfluid thermoregulation and a manufacturing process thereof are provided. The integrated device included a semiconductor material body having a surface; at least one buried channel extending in the semiconductor material body, arranged at a distance from the surface, and having a first and a second end; at least one port and a second port extending from the surface, respectively, as far as the first end and the second end of the buried channel, and being in fluid connection with the buried channel; and at least one heating element arranged on the semiconductor material body.

In accordance with another aspect of the foregoing embodiment of the invention, the heating element is arranged to be positioned over the at least one buried channel.

In accordance with another aspect of the invention, a temperature sensing element is arranged adjacent the at least one heating element, or where there are multiple heating elements, between pairs of adjacent heating elements. Ideally the temperature sensing element is configured to maintain the temperature of the heating element so as to maintain the temperature of fluid in the at least one buried channel at a predetermined temperature.

In practice, an integrated microreactor is provided that exploits the mechanical properties of semiconductor materials, and in particular of silicon. The microreactor can be manufactured using steps that are standard in microelectronics, and enables fluids to be contained and/or circulated in microchannels, if necessary mixed with appropriate reagents, as well as treated with heat, possibly repeated according to preset cycles, at precisely controlled temperature and duration.

BRIEF DESCRIPTION OF THE DRAWINGS

For a better understanding of the present invention, preferred embodiments thereof are now described, as non-limiting examples, with reference to the attached drawings, wherein.

DETAILED DESCRIPTION OF THE INVENTION

Figure 1:
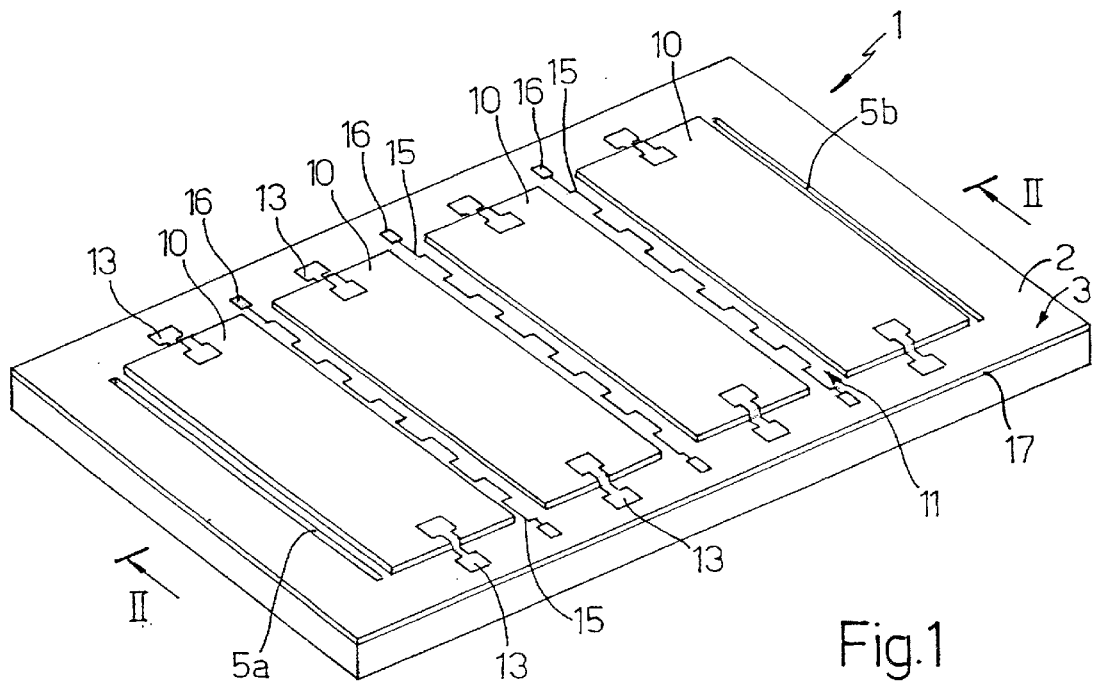
FIG. 1 is a perspective view of a base incorporating a first embodiment of the integrated device for thermoregulation according to the invention.
Figure 2:
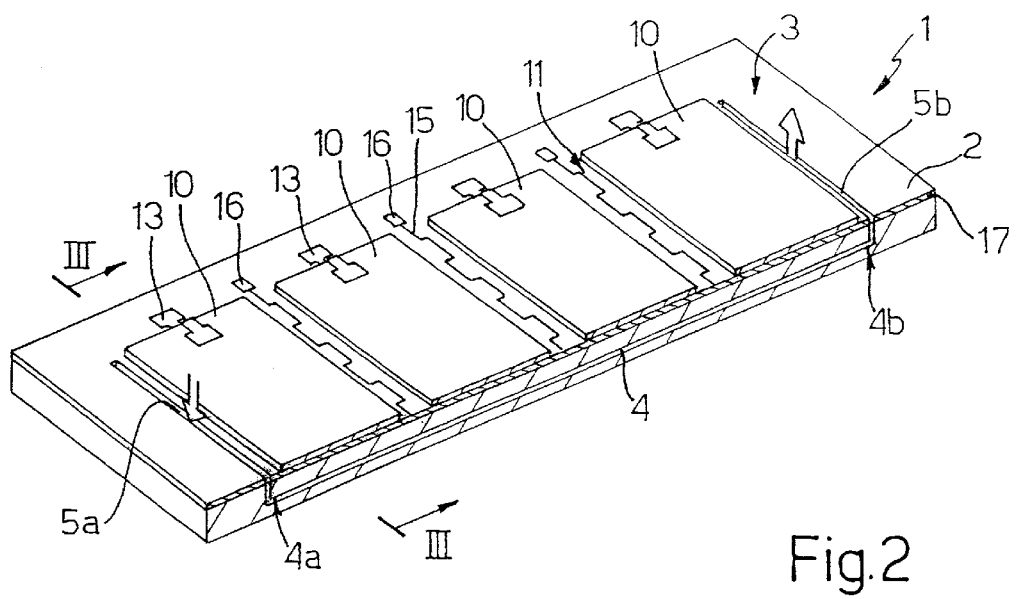
FIG. 2 shows a perspective cross-section of the integrated device of FIG. 1, taken along section line II—II of FIG. 1.
Figure 3:
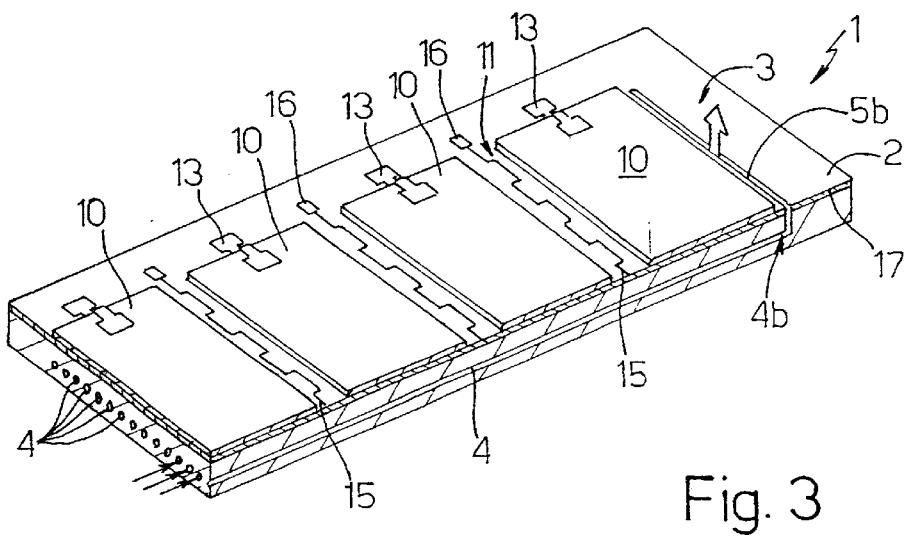
FIG. 3 is a perspective cross-section of the integrated device of FIG. 1, taken along section line III—III of FIG. 2.

FIGS. 1–3 show an integrated device 1 comprising a body 2 of semiconductor material, typically monocrystalline silicon, having a surface 3 and parallelepiped shape The body 2 is traversed by a plurality of channels 4 (visible in the sections of FIGS. 2 and 3) connected to the surface 3 of the body 2 through an inlet port 5a and an outlet port 5b, which are connected to the channels 4 at ends 4a and 4b of the channels 4. Heating elements 10 are present on the surface 3 of the body 2.

In detail, the channels 4 extend parallel to each other, in the lengthwise direction of the body 2, at a preset distance from the surface 3. For example, for the use of the device as a reactor in the DNA amplification process, the channels 4 may have a roughly circular or rectangular section, may be spaced 50 µm, and may be set at a depth of 5–10 µm from the surface 3. In the case of rectangular section, the channels 4 have a side of approximately 30×200 µm and occupy an area of 5×10 mm.

In FIGS. 1–3, the channels 4 are all connected to a same inlet port 5a and to a same outlet port 5b, and are thus in parallel. The inlet port 5a and outlet port 5b have an elongated shape and extend perpendicularly to the channels 4 and to the surface 3, at the two opposite ends of the channels 4.

Figure 4:
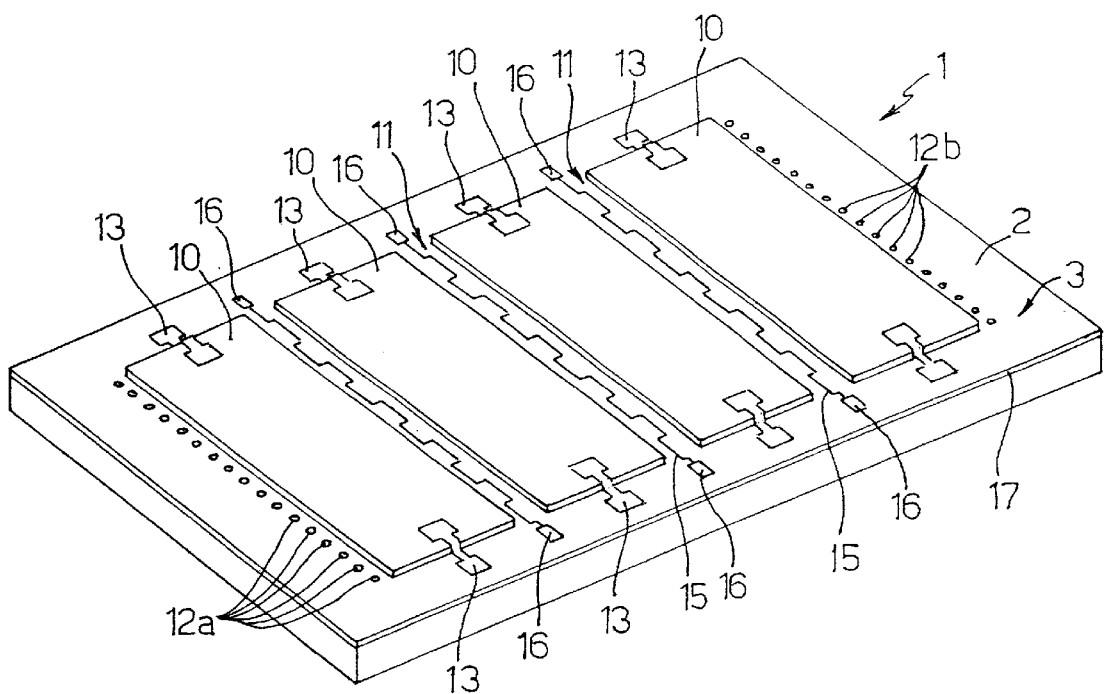
FIG. 4 shows a perspective view similar to that of FIG. 1, for a second embodiment of the thermoregulation integrated device according to the invention.

In the embodiment of FIG. 4, the channels 4 are spaced from each other and have respective inlet ports 12a and respective outlet ports 12b, which extend perpendicular to the channels 4 and to the surface 3. The inlet ports 12a are preferably aligned and connected to a first end 4a of the channels 4, and the outlet ports 12b are aligned and connected to a second end 4b of the channels 4.

The heating elements 10 are formed, as been mentioned, on the surface 3 of the body 2 and are insulated from the body 2 by an electrically insulating material layer 17, for example of silicon dioxide.

Each of the heating elements 10, which are four in number in the illustrated embodiment, comprise a rectangular region that extends transversely with respect to the extension of the channels 4, and the heating elements 10 are adjacent to each other so as to practically cover the entire portion of the surface 3 overlying the channels 4, except for intermediate strips 11 of the surface 3. Each of the heating elements 10 is connected by two electric connection regions 13 arranged on the opposite shorter sides of each of the heating elements 10.

As illustrated in FIG. 1, sensor elements 15 extend above the intermediate strips 11 of the surface 3, and include for example coil-shaped metal regions that are represented schematically and are connected at their ends to contact regions 16. The sensing elements 15 are of a material having a resistance that varies with the temperature and are connected to a resistance sensing circuit of known type, for example of bridge type, not illustrated and preferably formed in the body 2.

In a way which is not illustrated, the body 2 may integrate electronic components for controlling the temperature and/or for processing the signals picked up by the integrated device.

In use, the liquid to be treated and/or to be made to react with a reagent is introduced from a reservoir located above the integrated device 1 through the inlet port 5a or the inlet ports 12a, is forced to flow through the channels 4, and is possibly mixed with appropriate reagents at a controlled temperature. The heating elements 10 maintain a controlled temperature throughout the channel area; in particular, because of its micrometric dimensions, the entire channel area 4 is evenly heated, and there is no temperature gradient along and across the channels 4 themselves.

According to the treatment to be carried out, it is possible to perform a series of heat cycles, each time controlling the temperature with precision as desired for a preset time by virtue of the temperature sensors 15 cooperating with a suitable control system of known type.

The treated and/or reacted liquid exits the integrated device 1 through the outlet port 5b or the outlet ports 12b.

An example of a manufacturing process for the integrated device 1 will now be described with reference to FIGS. 5–14.

Figure 5:
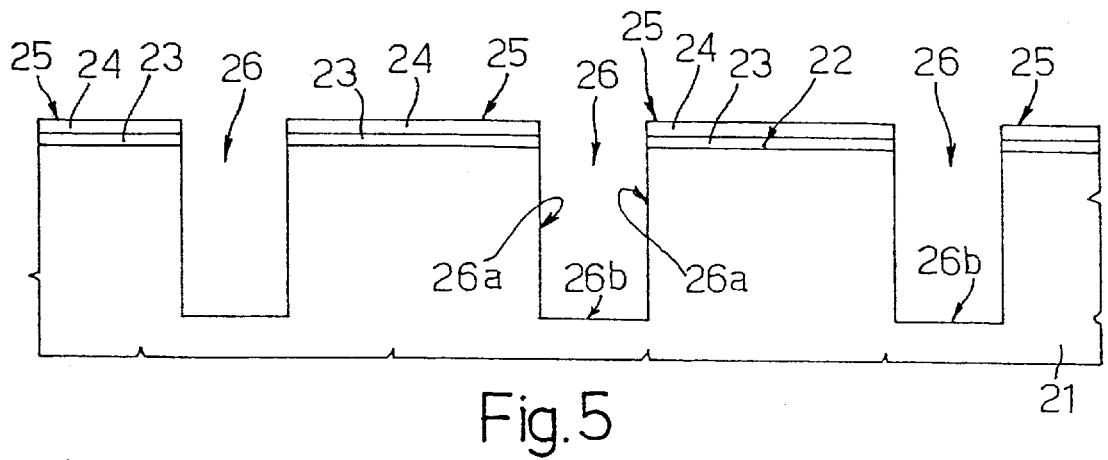
FIG. 5 shows a cross-section of a semiconductor wafer in a first manufacturing step of the device of FIG. 1.

As illustrated in FIG. 5, a hard mask 25 is initially formed on the surface 22 of a wafer 21 of semiconductor material, for example silicon, using processing steps known in microelectronics; the hard mask 25 comprising overlying oxide regions 23 and nitride regions 24, which delimit between each other elongated ports extending perpendicularly to the drawing plane.

Subsequently, using the hard mask 25, the wafer 21 is etched (first trench etch), so as to form trenches 26 (FIG. 5) having a width, for example, of between 0.2 and 3 µm, and a depth of, for example, between 20 and 30 µm. The trenches 26 are preferably parallel to one another and spaced 1–30 µm.

Figure 6:
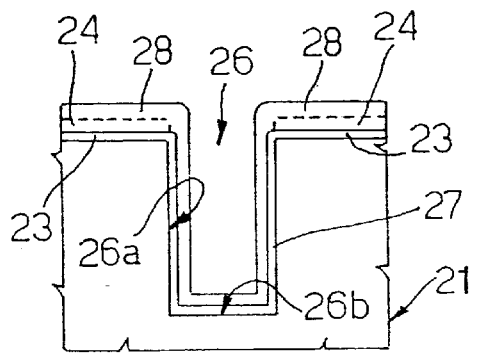
FIGS. 6–11 illustrate cross-sections of a part of the wafer of FIG. 5, in subsequent manufacture steps.
Figure 7:
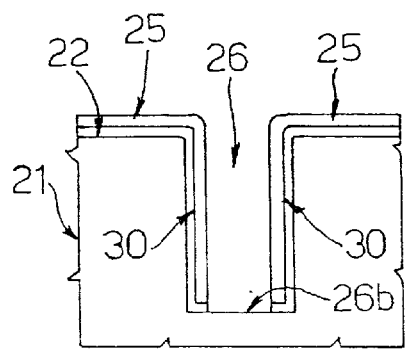
Figure 8:
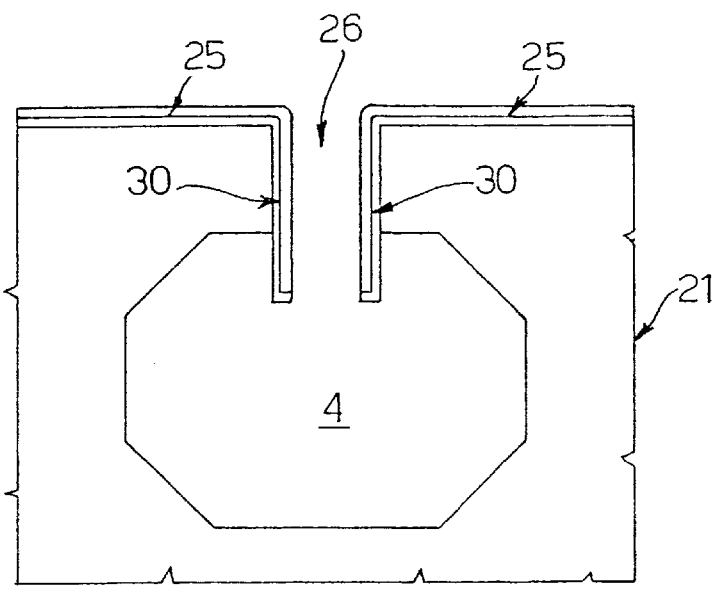
Figure 9:
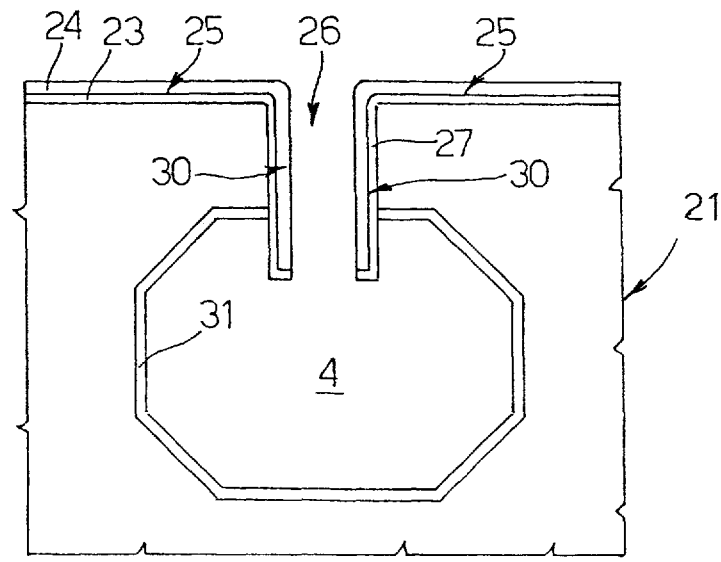
Figure 10:
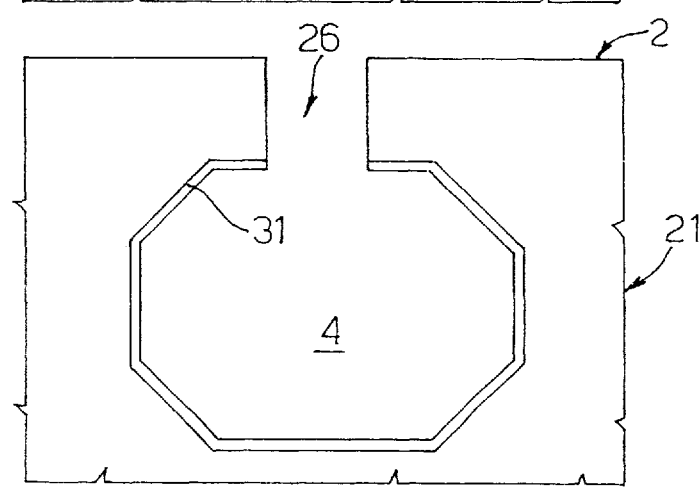
Figure 11:
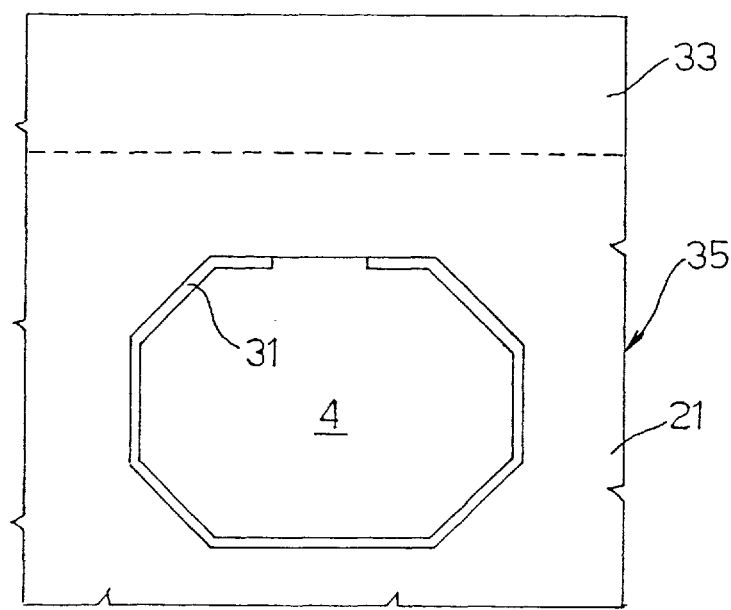
Figure 12:
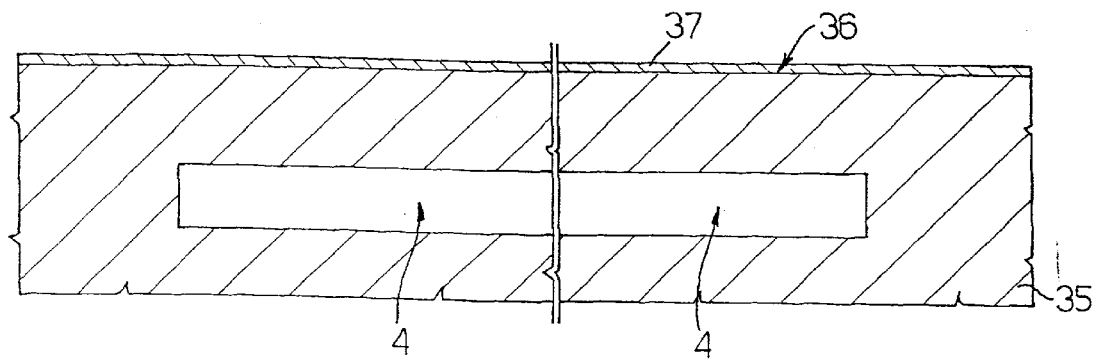
FIGS. 12–14 show longitudinal sections, perpendicular to those of FIGS. 6–11 and at an enlarged scale, in 120 subsequent manufacture steps.

Subsequently, as shown in FIG. 6, the wafer 21 is oxidized to form an oxide layer 27 having a thickness, for instance, of approximately 20 nm, which covers the walls 26a and bottom 26b of the trenches 26 and joins the oxide portions 23, so as to form a single layer. In the illustrated embodiment, a nitride layer 28 is then deposited having a thickness of between 90 and 150 nm, joining the nitride portions 24, to form a single layer. The second nitride layer 28, however, is not indispensable.

Subsequently (FIG. 7), the nitride is dry etched and the oxide is dry or wet etched. The horizontal portions of the nitride layer 28 and oxide layer 27 as well as the horizontal portions of the second nitride layer 28 on the surface 3 of the wafer 21 are so removed from a bottom 26b of the trenches 26, so forming spacers 30 on walls 26a of the trenches 26 and leaving the monocrystalline silicon bare on the bottom 26b of the trenches 26. The hard mask 25 remains on the surface 3 of the wafer 21.

Next (FIG. 8), silicon is etched beneath the trenches 26 for a given time using tetramethyl ammonium hydroxide (TMAH). Alternatively, an isotropic etch may be carried out. Thus the channels 4 are formed, which have a much greater width than the trenches 26.

Subsequently (FIG. 9), the walls of the channels 4 are coated with an inhibiting layer 31, which does not allow epitaxial growth. For this purpose, for instance, a fast oxidation step may be carried out, so as to grow an oxide layer (having a thickness greater than that of the oxide portions 23 and 27 that coat the surface 3 of the wafer 21 and the wall 26a of the trenches 26, as explained later, for example a thickness of between 60 and 100 nm), or else a layer of a material chosen among deposited oxide, nitride and tetraethyl orthosilicate (TEOS) may be deposited in a similar way. Alternatively, the inhibiting layer 31 may be dispensed with, as explained hereinbelow.

Next (FIG. 10), the first spacers 30 are removed from the walls 26a of the trenches 26, and the hard mask 25 is removed from the surface 3 of the wafer 21. During removal of the oxide portions 26 and 27, also part of the inhibiting layer 31 is removed, which, however, being thicker, as mentioned above, is not removed completely and remains to a sufficient extent to guarantee complete coverage of the walls of the channels 4.

Subsequently (FIG. 11), an epitaxial layer 33 is grown, using the monocrystalline silicon of the wafer 21 as nucleus. Consequently, monocrystalline silicon grows horizontally inside the trenches 26, so closing them, and vertically starting from the surface 3 (which is no longer illustrated in FIG. 11). If the inhibiting layer 31 is present, it inhibits growth of the silicon inside the channels 4 in such a way that the latter maintain their original dimensions determined by the timed TMAH etching. If instead, the inhibiting layer 31 is not present, the channels 4 partially close. This may be advantageous in the case where the exact dimensions of the channels 4 are not very important, and it is preferred, instead, not to have any material other than silicon on the walls of the channel 4.

In this way, a monolithic monocrystalline-silicon wafer 35 is obtained, including the substrate 21 and the epitaxial layer 33, and housing completely closed channels 4, which are delimited internally by the inhibiting layer 31.

In a way that is not shown, inside the wafer 35 conductive and/or insulating regions may be formed for manufacturing integrated electrical components belonging to control circuits and/or circuits for processing signals required for the operation of the thermoregulation device 1.

Figure 13:
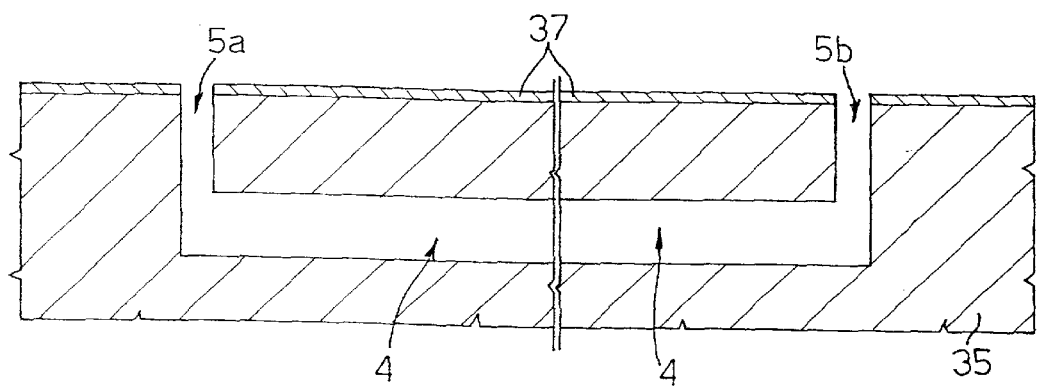
Figure 14:
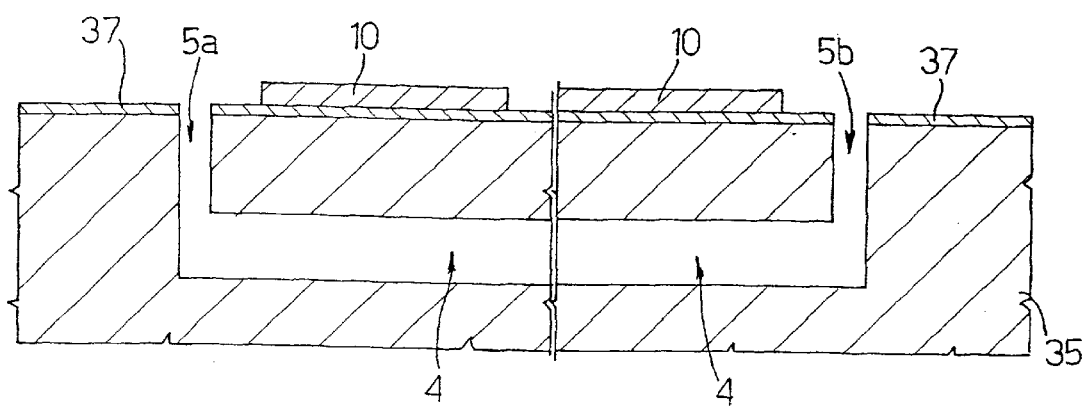

Subsequently (FIG. 12), on the surface 36 of the wafer 35 an insulating layer 37, for example of silicon dioxide, is formed. The insulating layer 37 has, for example, a thickness of 200–300 nm so as to have a reduced thermal resistance. Next, using a trench mask (not shown), the inlet ports 5a or 12a and outlet ports 5b or 12b are formed (FIG. 13). Finally, the heating elements 10 are formed, for example a polycrystalline silicon layer is deposited and defined photolithographically (FIG. 14).

Before or after forming the heating elements 10, on the wafer 35 conductive and/or insulating regions are formed as necessary for manufacturing integrated electronic components, not shown. Further steps then follow including depositing and defining metal layers to form metal connection regions 13, the sensing elements 15, and electric connection lines, as well as any other steps required for forming service layers. Finally, the wafer 35 is fixed to a silicon cover wafer (not shown) containing reservoirs and further elements necessary for the desired application, and the assembly is then cut into individual dice.

A different embodiment of the present invention, in which the channels have a very high depth, will now be described with reference to FIGS. 15–26.

Figure 15:
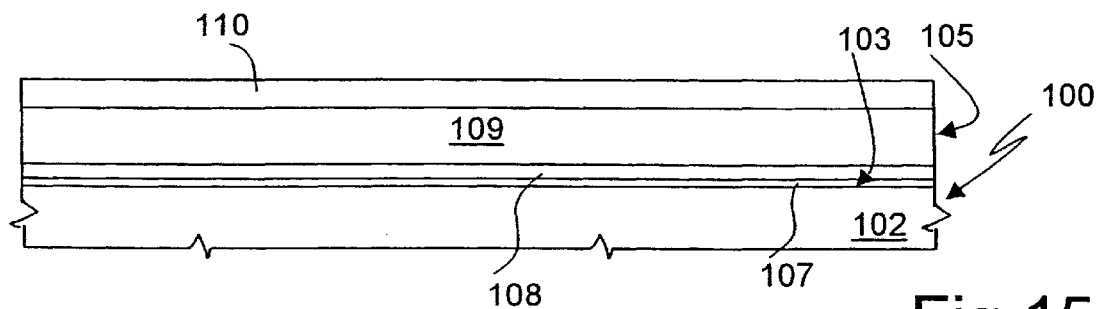
FIG. 15 shows a cross-section of a semiconductor material wafer, in an initial manufacture step of a different embodiment of the present invention.
Figure 16:
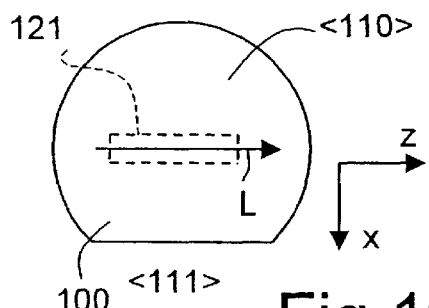
FIG. 16 shows a plan view of the wafer of FIG. 15.

More specifically, as shown in FIG. 15, a wafer 100, comprises a substrate 102 of monocrystalline semiconductor material, for example silicon, having an upper surface 103. The substrate 102 has a <110> crystallographic orientation instead of <100>, as can be seen in FIG. 16, which also shows the flat of the wafer 100 with <111> orientation. FIG. 16 also shows the longitudinal direction L of a channel 121, which is still to be formed at this step.

An upper stack of layers 105 is formed on the upper surface 103 and comprises a pad oxide layer 107, of, for example, approximately 60 nm; a first nitride layer 108, of, for example, approximately 90 nm; a polysilicon layer 109, of, for example 450–900 nm; and a second nitride layer 110, of, for example, 140 nm.

Figure 18:
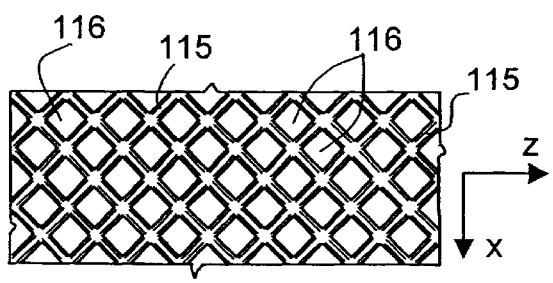
FIG. 18 shows a plan view of a portion of mask used for forming the structure of FIG. 17.

The upper stack of layers 105 is masked using a resist mask 115, which has a plurality of windows 116, arranged according to a suitable pattern, as shown in FIG. 18.

In detail, the apertures 116 have a square shape, with sides inclined at 45° with respect to a longitudinal direction of the resist mask 115, parallel to z-axis. For example, the sides of the apertures 116 are approximately 2 $\mu$m, and extend at a distance of 1.4 $\mu$m from a facing side of an adjacent aperture 116.

To allow deep channels to be formed in the substrate 102, as explained in greater detail hereinafter, the longitudinal direction z of the resist mask 115, parallel to the longitudinal direction of the buried channels to be formed in the substrate 102, is parallel to the flat of the wafer 100, which has an <111> orientation, as shown in FIG. 16.

Figure 17:
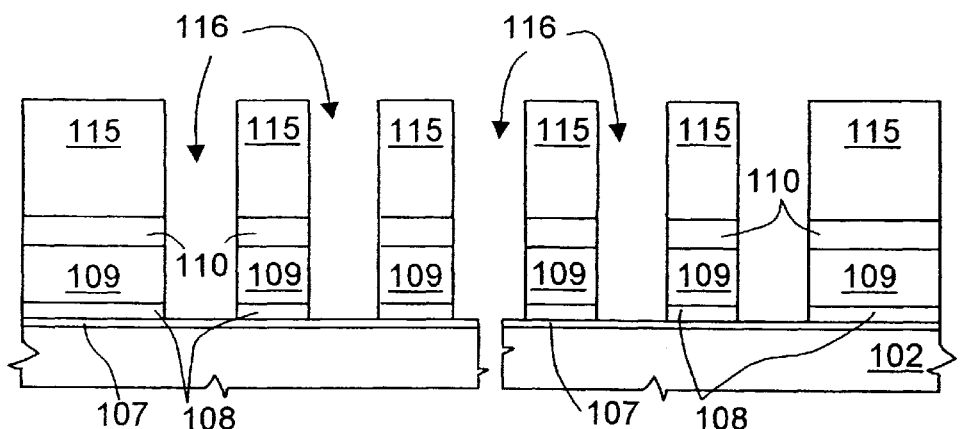
FIG. 17 shows a cross-section of the wafer of FIG. 15, in a successive manufacture step.
Figure 19:
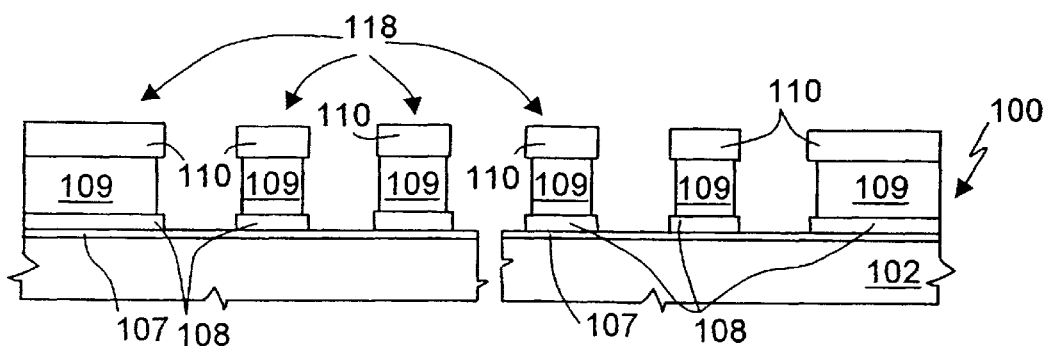
FIGS. 19–23 show cross-sections of the wafer of FIG. 17, in successive manufacturing steps.

Using the resist mask 115, the second nitride layer 110, the polysilicon layer 109, and the first nitride layer 108 are successively etched, thus providing a hard mask 118, formed by the remaining portions of the layers 108–110, and having the same pattern as the resist mask 115 shown in FIG. 18. Thus the structure of FIG. 17 is obtained.

Figure 20:
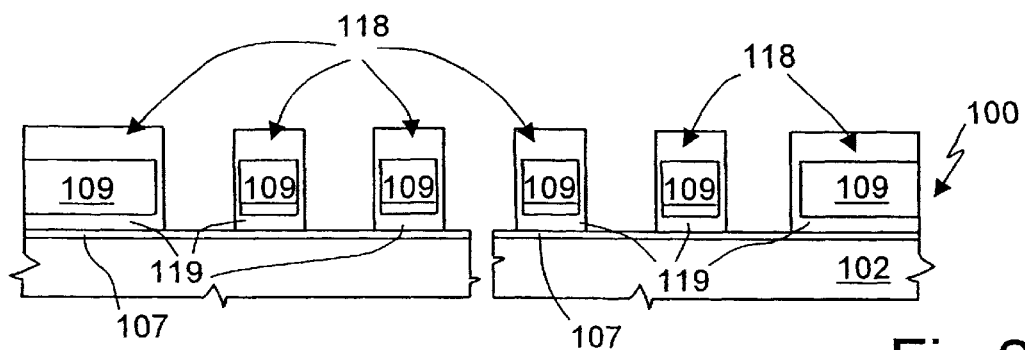

After removing the resist mask 115 (FIG. 19), the hard mask 118 is etched using TMAH (tetramethylammoniumhydroxide), such as to remove part of the uncovered polycrystalline silicon of the polysilicon layer 109 (undercut step) from the sides; a similar nitride layer is then deposited (for example with a thickness of 90 nm), which merges with the first and second nitride layers 108, 110. Subsequently, FIG. 20, the structure is dry etched, such as to completely remove the portions of conform nitride layer which extend immediately on top of the pad oxide layer 107. Thus the structure of FIG. 20 is obtained, which has a hard mask 118, grid-shaped, extending on the pad oxide layer 107, over the area where the channels are to be formed, with a form substantially reproducing the form of the resist mask 115, and is formed from the polysilicon layer 109, which is surrounded by a covering layer 119, which in turn is formed from the nitride layers 108, 110 and from the conform nitride layer.

Figure 21:
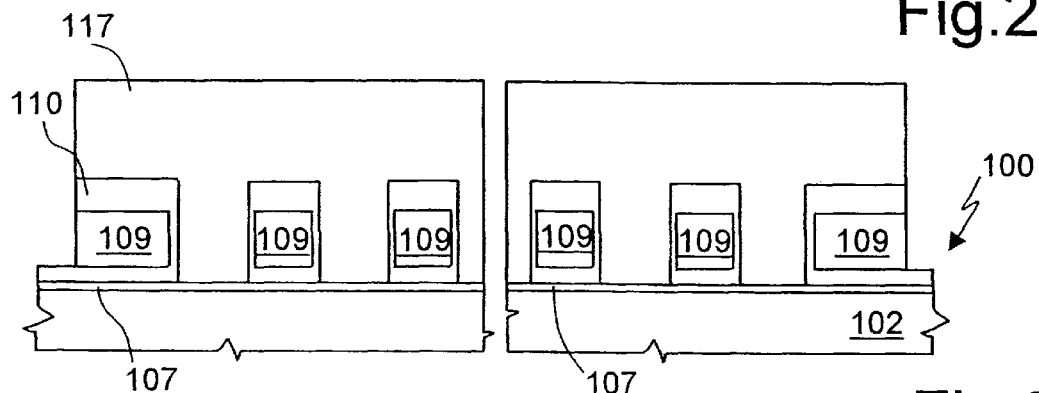
Figure 22:
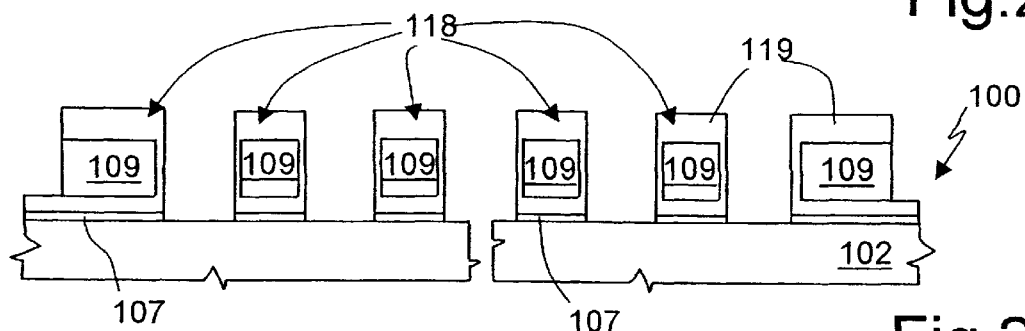

After forming the hard mask 118, FIG. 21, the second nitride layer 110 and the polysilicon layer 109 are etched externally to the area where the channels are to be formed, using a resist mask 117. After removing the resist mask 117, FIG. 22, the pad oxide layer is etched with 1:10 hydrofluoric acid, and is removed where it is exposed; in particular, externally to the area where the channels are to be formed, the pad oxide 107 is protected by the first nitride layer 108.

Figure 23:
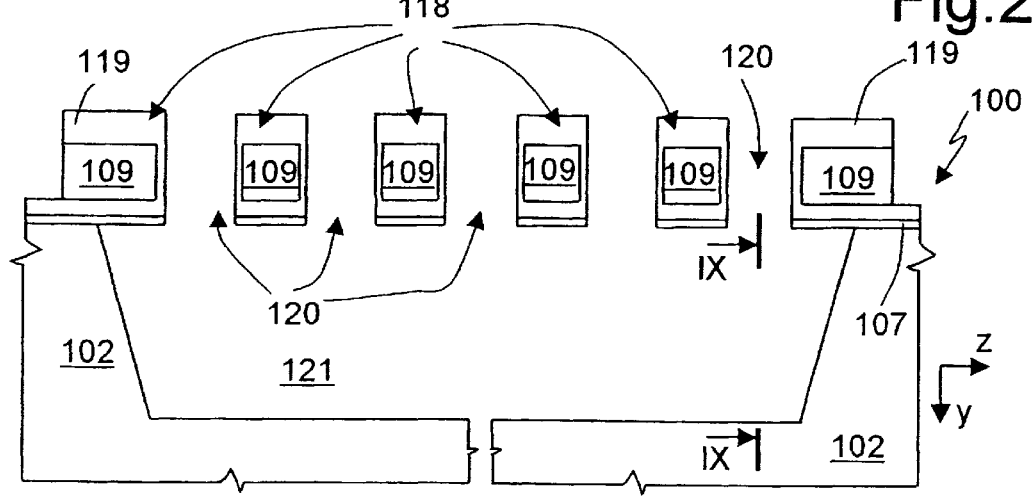
Figure 24:
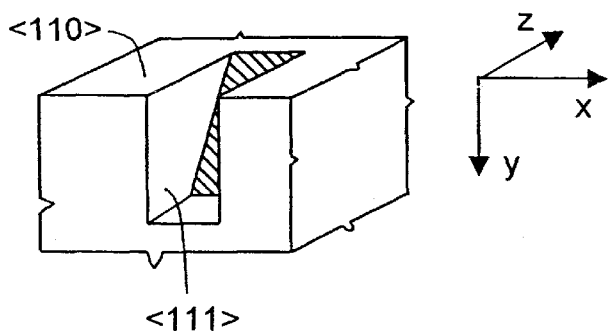
FIG. 24 shows a perspective cross-section of part of the wafer of FIG. 22.

Then, FIG. 23, the monocrystalline silicon of the substrate 102 is etched using TMAH, to a depth of 500–600 $\mu$m, thus forming one or more channels 121.

The use of a substrate 102 with <110> orientation, the pattern of the hard mask 118, and its orientation with respect to the wafer 100, cause silicon etching to preferentially occur in y-direction (vertical), rather than in x-direction, with a speed ratio of approximately 30:1. Thereby, the TMAH etching gives rise to one or more channels 121, the vertical walls of which are parallel to the crystallographic plane <111>, as shown in the perspective cross-section of FIG. 24.

The high depth of the channels 121, which can be obtained through the described etching conditions, reduces the number of channels 121 that are necessary for processing a predetermined quantity of fluid, and thus reduces the area occupied by the channels 121. For example, if a capacity of 1 ul is desired, with a length of the channels 21 in the z-direction of 10 mm, where previously it had been proposed to form twenty channels with a width of 200 $\mu$m (in x-direction) and a depth of 25 $\mu$m (in y-direction), with a total transverse dimension of approximately 5 mm in x-direction (assuming that the channels are at a distance of 50 $\mu$m from one another), it is now possible to form only two channels 121 having a width of 100 $\mu$m in x-direction, and a depth of 500 $\mu$m, with an overall transverse dimension of 0.3 mm in x-direction, the channels being arranged at a distance of 100 $\mu$m from one another, or it is possible to form a single channel 121 with a width of 200 $\mu$m.

Figure 25:
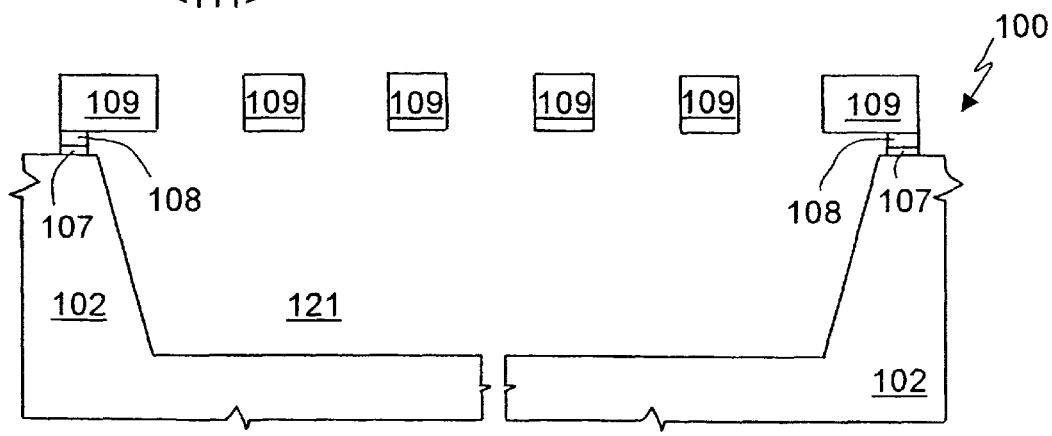
FIGS. 25-26 show cross-sections of the wafer of FIG. 23, on a reduced scale and in successive manufacture steps.

Subsequently, FIG. 25, the covering layer 119 is removed from the front of the wafer 100 (nitride layers 108, 110, conform layer, and pad oxide layer 107); in this step, the nitride and the pad oxide layers 108, 107 are also removed externally to the area of the channels 121, except on the outer periphery of the channels 121, below the polysilicon layer 109, where they form a frame region indicated at 122 as a whole.

Figure 26:
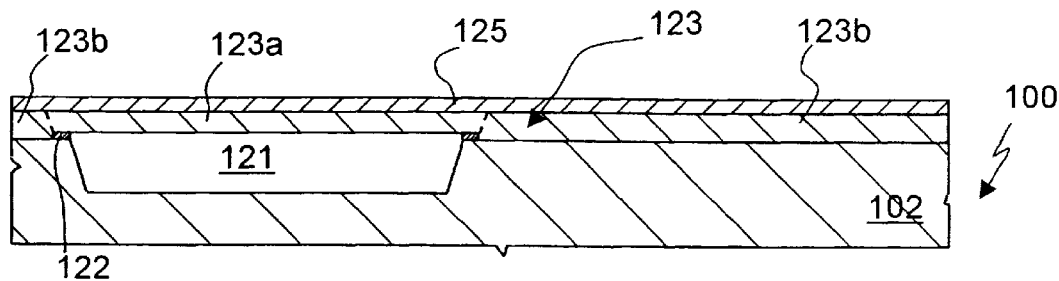

Then, FIG. 26, an epitaxial layer 123 is grown, with a thickness, for example, of 10 $\mu$m. As is known, the epitaxial growth takes place both vertically and horizontally; thus a polycrystalline epitaxial portion 123a grows on the polysilicon layer 109, and a monocrystalline epitaxial portion 123b grows on the substrate 102. A first insulating layer 125 is formed on the epitaxial layer 123; preferably, the first insulating layer 125 is obtained by thermal oxidation of silicon of the epitaxial layer 123, to a thickness of, for example, 500 nm.

The integrated device 1 has the following advantages:

it has a very small thermal mass as compared to present solutions, thanks to its micrometric dimensions and to the physical characteristics of monocrystalline silicon wherein the channels 4 are formed; consequently, it is possible to rapidly heat or cool the fluid flowing in the channels 4, with considerable reduction in the process times;

it requires very small operating power as compared to known solutions;

the manufacturing costs are much reduced and comparable with current integrated devices;

the treatment costs are much lower than presently, since the device according to the invention enables treatment of very small amounts of fluid (i.e., in the region of microliters instead of milliliters), and it is possible to achieve better performance of the chemical reactions due to the reduced path of the reagents;

the possibility of integrating both the control electronic devices and the processing electronic devices in a same semiconductor material body enables, on the one hand, a very precise control of the treatment conditions and, on the other, a further reduction in costs;

it is possible to manufacture portable analysis devices and disposable devices for performing analyses and treatments where it is essential to prevent contamination from fluids that do not belong to a same sample;

the thermoregulation device can be made in an easily reproducible way, because of the use of well-known and controllable manufacturing technologies;

since the channels 4 are buried inside the semiconductor wafer 35, they are not exposed to the external environment, even before fixing a covering element, and hence are less subject to possible contamination, for example due to subsequent manipulation and/or to the glue used for fixing the covering element;

the presence of channels 4 in the wafer 35 of semiconductor material and heating elements 10 on the surface of the wafer 35 with the interposition alone of insulating layers (insulating layer 37) yields a complete uniformity of temperature at the channels 4; consequently, during operation, no significant differences in temperature exist either between adjacent channels or along or across each channel 4; in practice, any point inside the channels 4 has the same temperature as the others, as is essential in particular applications, such as the process of DNA amplification; and given the ease of processing of the silicon substrate 21, it is moreover possible to make channels 4 having the desired shape and dimensions.

Furthermore, according to the different embodiment of the present invention described in FIGS. 15–26, the integrated device 1 has greatly reduced dimensions, owing to the high depth of the channels 21, which, as previously stated, reduces the number of channels necessary per unit of volume of processed fluid. In addition, the manufacture requires steps that are conventional in microelectronics, with reduced costs per item; the process also has low criticality and a high productivity, and does not require the use of critical materials.

Finally, it is clear that numerous variations and modifications may be made to the device and to the manufacturing process described and illustrated herein, all falling within the scope of the invention, as defined in the attached claims. For example, instead of having a plurality of channels 4, the thermoregulation device 1 may comprise a single buried channel of a suitable width, and the trenches 26 may be set at a distance whereby, in the subsequent timed TMAH etching for forming the channels 4, the silicon between the channels 4 themselves is removed completely.

What is claimed is:

1. An integrated device for microfluid thermoregulation, comprising:

a monolithic semiconductor material body having a surface;

at least one buried channel extending in said semiconductor material body, arranged at a distance from said surface, and having a first and a second end;

at least one first port and second port extending from said surface respectively as far as said first end and second end of said buried channel, and being in fluid connection with said buried channel; and at least one heating element arranged on said semiconductor material body.

2. The device according to claim 1, comprising a plurality of buried channels extending parallel and adjacent to each other.

3. The device according to claim 2, wherein said inlet port and said outlet port are connected to all said buried channels.

4. The device according to claim 2, comprising a plurality of inlet ports and a plurality of outlet ports, said inlet and outlet ports extending from said surface of said semiconductor material body to a respective end of a respective buried channel.

5. The device according to claim 2, comprising a plurality of heating elements extending adjacent to each other, and each having opposite electric connection regions arranged on opposite sides of said buried channel.

6. The device according to claim 5, comprising a plurality of temperature sensing elements arranged between pairs of adjacent heating elements.

7. The device of claim 1, wherein said semiconductor material body comprises a monocrystalline substrate, with a <110> crystallographic orientation, and wherein each buried channel has a longitudinal direction that is substantially parallel to a crystallographic plane with a <111> orientation.

8. The device according to claim 7, wherein each buried channel has a depth of up to 600–700 µm.

9. A process for manufacturing an integrated device for microfluid thermoregulation, comprising:
    forming a monolithic semiconductor material body having a surface;
    forming at least a buried channel extending in said semiconductor material body, arranged at a distance from said surface, and having a first and a second end;
    forming at least a first and a second port extending from said surface respectively as far as said first and second ends of said buried channel, and being in fluid connection with said buried channel; and
    forming at least a heating element on said semiconductor material body.

10. The process according to claim 9, wherein forming a semiconductor material body and forming at least a buried channel comprises:
    forming a substrate of semiconductor material;
    forming surface trenches in said substrate; and
    growing an epitaxial layer on said substrate.

11. The process according to claim 10, comprising, after forming surface trenches and before growing an epitaxial layer, anisotropically etching the substrate beneath said surface trenches to form said channels.

12. The process according to claim 9, wherein forming a semiconductor material body comprises forming a monocrystalline substrate; forming said buried channel in said monocrystalline substrate; and growing an epitaxial layer on top of said monocrystalline substrate and said buried channel.

13. The process according to claim 12, wherein forming a monocrystalline substrate comprises growing semiconductor material with a <110> orientation, and forming a buried channel comprises etching said monocrystalline substrate along a parallel direction to an <111> orientation plane.

14. The process according to claim 13, wherein, during etching of said monocrystalline substrate, a grid-shaped mask is used with polygonal apertures, with sides extending at approximately 45° with respect to said <111> orientation plane.

15. The process according to claim 13, wherein said monocrystalline substrate is etched using tetramethyl ammonium hydroxide.

16. The process according to claim 12, wherein forming a buried channel comprises masking said substrate through a grid-like hard mask, and etching said substrate through the hard mask.

17. The process according to claim 16, wherein said hard mask comprises a polycrystalline region, surrounded by a covering layer of dielectric material, and in that, after etching of said substrate, said covering layer is removed, and said epitaxial layer grows on said polycrystalline region and forms a polycrystalline region, and on said substrate and forms a monocrystalline region.

18. The process according to claim 16, wherein said hard mask comprises a dielectric material grid, and said epitaxial layer grows on said substrate and on said dielectric material grid, forming a monocrystalline region on said substrate, and a polycrystalline region on said dielectric material grid.

19. The process of claim 12, comprising depositing an insulating material layer on said semiconductor material body, before forming at least a heating element.

20. The process of claim 12, comprising forming at least a thermosensing element on said semiconductor material body, adjacent to said heating element.

21. A device for microfluid thermoregulation comprising:
    a plurality of buried channels formed a predetermined distance beneath a surface of a monolithic semiconductor material body;
    first and second ports formed in the semiconductor material body and in fluid communication with the surface of the semiconductor material body and with first and second ends, respectively, of the at least one buried channel; and
    at least one heating element formed on the surface of the semiconductor material body and positioned over the at least one buried channel to heat fluid in the at least one buried channel.

22. The device of claim 21, further comprising a temperature sensing element arranged adjacent the at least one heating element, the temperature sensing element configured to regulate the temperature of the at least one heating element to thereby regulate the temperature of fluid in the at least one buried channel.

23. A method for manufacturing a device for microfluid thermoregulation, comprising:
    forming at least one buried channel a predetermined distance beneath a surface of a monolithic semiconductor material body;
    forming first and second ports in the semiconductor material body to be in fluid communication with the surface of the semiconductor material body and with first and second ends, respectively, of the at least one buried channel; and
    forming at least one heating element on the surface of the semiconductor material body to be positioned over the at least one buried channel for heating fluid in the at least one buried channel.

24. The method of claim 23, further comprising forming at least one temperature sensing element adjacent the at least one heating element on the surface of the semiconductor material body, the temperature sensing element configured to regulate the temperature of the at least one heating element to thereby regulate the temperature of fluid in the at least one buried channel.

25. An integrated device for microfluid thermoregulation, comprising:
    a monolithic semiconductor material body having a surface;
    a plurality of buried channels extending parallel and adjacent to each other in said semiconductor material body, arranged at a distance from said surface, and each buried channel having a first and a second end;
    at least one first port and second port extending from said surface respectively as far as said first end and second end of each buried channel, and being in fluid connection with each buried channel; and at least one heating element arranged on said semiconductor material body.

26. A process for manufacturing an integrated device for microfluid thermoregulation, comprising:

forming a substrate of semiconductor material;

forming surface trenches in said substrate;

growing an epitaxial layer on a surface said substrate to form at least a buried channel extending in said semiconductor material body, arranged at a distance from said surface, and having a first end and a second end;

forming at least a first and a second port extending from said surface respectively as far as said first and second ends of said buried channel, and being in fluid connection with said buried channel; and forming at least a heating element on said semiconductor material body.

27. A process for manufacturing an integrated device for microfluid thermoregulation, comprising:

forming a monocrystalline substrate;

forming a channel in said monocrystalline substrate;

growing an epitaxial layer on a surface of said monocrystalline substrate and over said channel to form at least a buried channel extending in said semiconductor material body, arranged at a distance from said surface, and having a first and a second end;

forming at least a first and a second port extending from said surface respectively as far as said first and second ends of said buried channel, and being in fluid connection with said buried channel; and forming at least a heating element on said semiconductor material body.

* * * * *